(12) United States Patent
Claesson et al.

(10) Patent No.: US 11,708,019 B2
(45) Date of Patent: Jul. 25, 2023

(54) METHOD FOR CONTROLLING A VEHICLE LIGHTING DEVICE, A CONTROL DEVICE, A VEHICLE LIGHTING DEVICE, A VEHICLE, A COMPUTER PROGRAM AND A COMPUTER-READABLE MEDIUM

(71) Applicant: Scania CV AB, Södertälje (SE)

(72) Inventors: André Claesson, Tullinge (SE); Sami Teppola, Nykvarn (SE); Mikko Kallio, Hölö (SE); Tomas Skeppström, Södertälje (SE); Morgan Colling, Hölö (SE); Linus Ährlig, Västerhaninge (SE); Robert Sjödin, Nyköping (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/253,689

(22) PCT Filed: Jul. 5, 2019

(86) PCT No.: PCT/SE2019/050671
§ 371 (c)(1),
(2) Date: Dec. 18, 2020

(87) PCT Pub. No.: WO2020/013754
PCT Pub. Date: Jan. 16, 2020

(65) Prior Publication Data
US 2021/0261047 A1    Aug. 26, 2021

(30) Foreign Application Priority Data

Jul. 10, 2018 (SE) .................................... 1850875-4

(51) Int. Cl.
*B62D 35/00* (2006.01)
*B60Q 1/50* (2006.01)
(Continued)

(52) U.S. Cl.
CPC .......... *B60Q 1/503* (2013.01); *B60Q 1/1407* (2013.01); *B60Q 1/2607* (2013.01); *B60Q 1/30* (2013.01);
(Continued)

(58) Field of Classification Search
USPC ........................................................ 340/472
See application file for complete search history.

(56) References Cited

U.S. PATENT DOCUMENTS 9,734,744 B1 * 8/2017 McGie ................ G08G 1/0965
10,924,679 B2 * 2/2021 Lee ...................... G06V 20/597
(Continued)

FOREIGN PATENT DOCUMENTS

BE         1024431 A1      2/2018
DE   10 2015 007 609 B3   10/2016
(Continued)

OTHER PUBLICATIONS

Novelty Search Report dated Feb. 19, 2018.
(Continued)

*Primary Examiner* — Brent Swarthout
(74) *Attorney, Agent, or Firm* — Banner & Witcoff, Ltd.

(57) ABSTRACT

The invention relates to a method, performed by a control device (10), for controlling a vehicle lighting device (100), the vehicle lighting device (100) includes the control device (10); and at least one electronic display unit (20) arranged at one end (12, 14) of a vehicle (1), wherein the control device (10) is arranged to control the at least one display unit (20) to show various types of vehicle lights (22). The method includes: collecting (s101) data relating to the vehicle surroundings; and controlling (s102) the at least one display unit (20) to adapt at least one vehicle light (22) based on the collected data.

25 Claims, 7 Drawing Sheets

(51) Int. Cl.
  *B60Q 1/14* (2006.01)
  *B60Q 1/26* (2006.01)
  *B60Q 1/30* (2006.01)
  *B60Q 1/34* (2006.01)
  *B60Q 1/44* (2006.01)
  *G08G 1/0967* (2006.01)

(52) U.S. Cl.
  CPC .............. *B60Q 1/34* (2013.01); *B60Q 1/44* (2013.01); *B60Q 1/525* (2013.01); *B62D 35/00* (2013.01); *G08G 1/0967* (2013.01)

(56) References Cited

U.S. PATENT DOCUMENTS

| | | | |
|---|---|---|---|
| 2005/0141232 A1* | 6/2005 | Chon | B60Q 1/1415 362/509 |
| 2008/0002420 A1 | 1/2008 | Lambert et al. | 362/543 |
| 2009/0026797 A1 | 1/2009 | Wood | |
| 2011/0292673 A1 | 12/2011 | Aono et al. | 362/553 |
| 2014/0070698 A1* | 3/2014 | Pierce | B60Q 1/085 315/82 |
| 2014/0268852 A1 | 9/2014 | Foley et al. | 362/520 |
| 2015/0043231 A1 | 2/2015 | Clark | 362/485 |
| 2016/0264043 A1 | 9/2016 | Schloesser | |
| 2017/0120804 A1 | 5/2017 | Kentley et al. | |
| 2017/0240098 A1 | 8/2017 | Sweeney et al. | |
| 2017/0248964 A1 | 8/2017 | Kentley et al. | |
| 2018/0173237 A1 | 6/2018 | Reiley et al. | |
| 2019/0259285 A1* | 8/2019 | Kubo | G08G 1/0965 |
| 2019/0366918 A1* | 12/2019 | Zhou | B60Q 1/30 |
| 2020/0114815 A1* | 4/2020 | Massengill | B60Q 1/535 |
| 2021/0046864 A1* | 2/2021 | Elgrably | G08G 1/167 |
| 2021/0229692 A1* | 7/2021 | Johnson | B60W 50/14 |

FOREIGN PATENT DOCUMENTS

| | | |
|---|---|---|
| DE | 102016209099 A1 | 7/2017 |
| DE | 10 2016 115 200 A1 | 12/2017 |
| WO | 2017073248 A1 | 5/2017 |

OTHER PUBLICATIONS

Office Action dated Jan. 30, 2019 in corresponding Swedish Patent Application No. 1850875-4.
International Search Report dated Sep. 10, 2019 in corresponding PCT International Application No. PCT/SE2019/050671.
Written Opinion dated Sep. 10, 2019 in corresponding PCT International Application No. PCT/SE2019/050671.
Feb. 17, 2022—(EP) Supplementary European Search Report—U. S. Appl. No. 19/835,033.
Mar. 2, 2022—(EP) Communication—U.S. Appl. No. 19/835,033.

* cited by examiner

METHOD FOR CONTROLLING A VEHICLE LIGHTING DEVICE, A CONTROL DEVICE, A VEHICLE LIGHTING DEVICE, A VEHICLE, A COMPUTER PROGRAM AND A COMPUTER-READABLE MEDIUM

CROSS-REFERENCE TO RELATED APPLICATIONS

The present application is a 35 U.S.C. §§ 371 national phase conversion of PCT/SE2019/050671, filed Jul. 5, 2019, the contents of which are incorporated herein by reference which claims priority of Swedish Patent Application No. 1850875-4, filed Jul. 10, 2018, the contents of which are incorporated by reference herein. The PCT International Application was published in the English language.

TECHNICAL FIELD

The present invention relates to a method for controlling a vehicle lighting device. More specifically, the present invention relates to a method for controlling a vehicle lighting device comprising at least one electronic display unit. The present invention also relates to a control device, a vehicle lighting device, a vehicle, a computer program and a computer-readable medium.

BACKGROUND

Vehicles today comprise different kinds of lights, such as headlights, rear lights, brake lamps, blinkers/flashers etc. The configuration and characteristics of these lights vary depending on the vehicle manufacturer. Vehicle lighting systems may be subject to regulatory requirements, which may differ depending on the jurisdiction/country of the vehicle, and the configuration of the vehicle lights may therefore vary depending on in which jurisdiction/country the vehicle will be used. This is discussed in document US2008/0002420 A1, which discloses a headlamp fixture and a control system for controlling a vehicular lighting system to produce particular lighting patterns required under different regulatory regimes.

SUMMARY

Despite known solutions in the field, it would be desirable to achieve a way of controlling a vehicle lighting device, which solves or at least alleviates at least some of the drawbacks of the prior art.

An object of the present invention is therefore to achieve a new and advantageous method for controlling a vehicle lighting device comprising at least one electronic display unit, which method increases safety and flexibility.

Another object of the invention is to achieve a new and advantageous control device, vehicle lighting device, vehicle, computer program and computer-readable medium, which increases safety and flexibility.

The herein mentioned objects are achieved by a method hereof for controlling a vehicle lighting device, a control device, a vehicle lighting device, a vehicle, a computer program and a computer-readable medium.

According to an aspect of the present invention, a method, performed by a control device, for controlling a vehicle lighting device is provided. The vehicle lighting device comprises the control device; and at least one electronic display unit arranged at one end of a vehicle. The control device is arranged to control the at least one display unit to show various types of vehicle lights. The method comprises: collecting data relating to the vehicle surroundings; and controlling the at least one display unit to adapt at least one vehicle light based on the collected data. It is to be understood that throughout this disclosure, vehicle light includes all conventional external lights of a vehicle, such as headlights, blinkers/flashers, rear lights, brake lights etc. Vehicle lights as herein disclosed may also comprise non-conventional vehicle lights, such as warning signs, informative text or similar. This will be further described below.

According to another aspect of the invention, a control device configured for controlling a vehicle lighting device is provided. The vehicle lighting device comprises at least one electronic display unit arranged at one end of a vehicle. The control device is arranged to control the at least one display unit to show various types of vehicle lights, the control device is also configured to collect data relating to the vehicle surroundings; and control the display unit to adapt at least one vehicle light based on the collected data.

According to yet another aspect of the invention, a vehicle lighting device is provided. The vehicle lighting device comprises at least one electronic display unit adapted to be arranged at one end of a vehicle. The vehicle lighting device further comprises a control device as disclosed herein.

According to an aspect of the invention, a vehicle is provided. The vehicle comprises a vehicle lighting device as disclosed herein.

Vehicles typically comprises a plurality of different vehicle lights, such as headlights, rear lights, brake lamps, blinkers/flashers etc. These commonly known lights comprises lamps, are individually controlled and typically have a fixed configuration and fixed characteristics. By using at least one electronic display unit instead of fixed lamps, the same display unit can show a plurality of vehicle lights at the same time. A plurality of vehicle lights does not mean a plurality of lamps, bulbs or diodes in a vehicle light. Thus, the display unit can show different vehicle lights, such as headlights, blinkers/flashers and brake lights at the same time. A display unit also enables a larger variety of different light configurations, such that the light(s) shown by the display unit can vary for example depending on in which country the vehicle is operating. Also, the shape and design of the vehicle lights may be adapted to different vehicle manufacturers or vehicle owners. In addition, different driving conditions may require different characteristics of the lights. Thus, by collecting data relating to the vehicle surroundings and controlling the at least one display unit based on the collected data, the lights provided by the at least one display unit may be adapted to the surroundings. Controlling the at least one display unit to adapt at least one vehicle light based on the collected data may comprise controlling the at least one display unit to temporarily change the characteristics of at least one vehicle light based on the collected data. In this way, greater flexibility is achieved and the safety of both the vehicle and the surroundings may be increased.

Further objects, advantages and novel features of the present invention will become apparent to one skilled in the art from the following details, and also by putting the invention into practice. Whereas examples of the invention are described below, it should be noted that it is not restricted to the specific details described. A skilled person having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION

Figure 1:
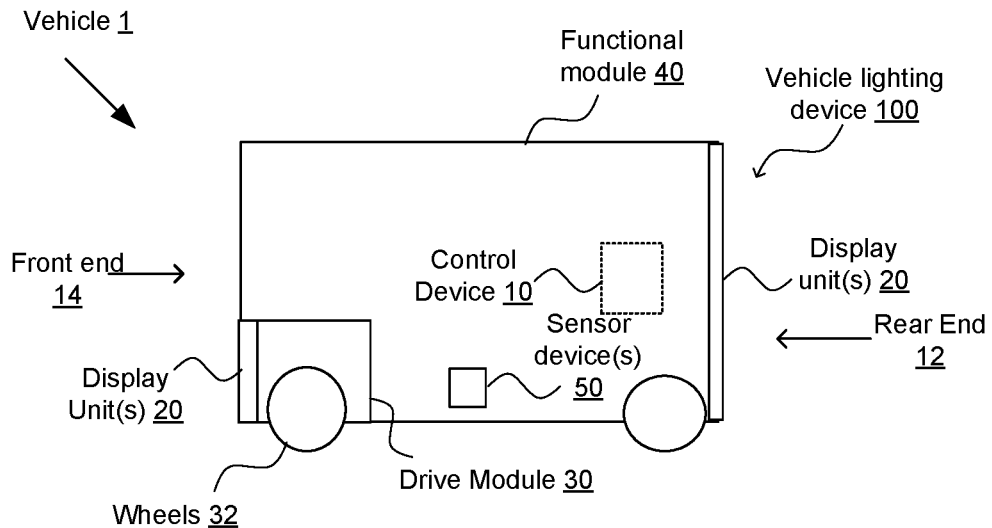
FIG. 1 schematically illustrates a vehicle according to an example.

During operation of a vehicle, situations may occur where something in the surroundings affects the visibility of a vehicle light. This may seriously affect the safety of the vehicle and the surroundings. To avoid such risks, a method for controlling a vehicle lighting device comprising at least one electronic display unit has been developed. The present disclosure is applicable on all sorts of vehicles having ground engaging means, such as wheels or tracks. However, the disclosure may relate to heavy vehicles, such as buses, trucks etc. Specifically, the present disclosure may relate to vehicles for use on public roads.

According to an aspect of the present disclosure, a method, performed by a control device, for controlling a vehicle lighting device is provided. The vehicle lighting device comprises the control device and at least one electronic display unit arranged at one end of a vehicle, wherein the control device is arranged to control the at least one display unit to show various types of vehicle lights. The methods comprising: collecting data relating to the vehicle surroundings and controlling the at least one display unit to adapt at least one vehicle light based on the collected data. Controlling the at least one display unit to adapt at least one vehicle light based on the collected data may comprise controlling the at least one display unit to adapt/change the characteristics of at least one vehicle light, such that the vehicle light is more distinguishable/noticeable/perceptible. Controlling the at least one display unit to adapt at least one vehicle light based on the collected data may comprise controlling the at least one display unit to adapt at least one vehicle light to increase safety. Controlling the at least one display unit to adapt at least one vehicle light based on the collected data may comprise controlling the at least one display unit to adapt/change the characteristics of at least one vehicle light to fulfil specific legal requirements.

The at least one display unit may comprise at least one digital screen, such as a plasma or an LCD screen. The at least one display unit may be referred to as a flat panel display. The at least one display unit does thus not relate to lamps, light bulbs or conventional LED strips or similar. The at least one display unit may also comprise a control unit for controlling what is shown on the digital screen. The digital screen of the at least one display unit may function according to conventional digital screens. The at least one display unit may be configured to cover at least part of a rear end side of a vehicle or at least part of a front end side of a vehicle. It may also be covered to cover at least part of a left or right side. The at least one display unit may comprise a flexible digital screen. The at least one display unit may thus comprise a digital screen with a material which makes it flexible/bendable. This may enable, the at least one display unit to be bent around the sides of the vehicle. Also, the at least one display unit may be adaptable to the shape of the vehicle. The digital screen may for example comprise a transparent film. The digital screen may comprise organic light-emitting diodes (OLED). Such flexible film may be attached on a surface of a glass or plastic screen/panel or it may be integrated in a glass or plastic screen/panel. The at least one display unit may be integrated in a vehicle panel. The color of the vehicle panel may thus be changed by changing the color of what is shown on the at least one display unit. Alternatively or additionally, the at least one display unit may comprise a transparent protective cover. In this way, the at least one display unit is more robust and resistant to the weather, dirt and other surrounding factors. The at least one display unit may be configured to allow a higher or a considerably higher light intensity than conventional digital screens. As an example, the at least one display unit comprises a plurality of light sources adapted to be arranged under/behind the digital screen to increase the light intensity. When the at least one display unit is arranged at a rear end of a truck, the at least one display unit may cover the majority of the rear end side of the truck. Depending on where on the vehicle the at least one display unit is arranged, different lights will be shown on the at least one display unit. The colors of the vehicle lights provided by the at least one display unit may be according to common standards. If the at least one display unit is arranged at the front end of the vehicle, the display unit will be controlled to show headlights, blinkers/flashers etc., whereas if the display unit is arranged at the rear end of the vehicle the display unit will instead show rear lights, brake lights etc. Thus, different parts of the same display can be illuminated with different colors and/or shapes. Non-conventional lights may also be illuminated in non-conventional shapes. The vehicle lighting device may comprise a plurality of display units and thus a plurality of screens. Such display units may be arranged on positions corresponding to positions of conventional vehicle lamps. The vehicle lighting device may comprise one display unit arranged at the front of a vehicle and one display unit arranged at the rear of the vehicle. According to an example, each display unit is configured to show a plurality of different vehicle lights. For example, a display unit may be configured to show a left brake light, a left blinker and a left rear light. The different vehicle lights do not have to be shown at the same time, but the display unit enables showing a plurality of vehicle lights at the same time. Also, vehicle lights that are currently not used may still be shown on the display unit but with a low light intensity corresponding to conventional unused vehicle lights. By using a display unit controlled by a control device, the vehicle does not have to be manufactured with a plurality of different fixed vehicle lamp structures and manufacture of the vehicle is thereby facilitated. Also, malfunctioning vehicle lights of conventional type with lamps may be cumbersome and difficult to repair. Having at least one display unit facilitates both error detection and repair. The at least one display unit may be integrated in the rear end or front end of the vehicle or it may be removably attached to the rear end or the front end.

Contrary to commonly known vehicle lighting systems with which, for example, high beam headlights may be activated when it is dark, the present disclosure does not relate to activation of a standard vehicle light based on data relating to the vehicle surroundings. Adapting a vehicle light relates to changing characteristics of a vehicle light when it is activated/showing. Thus, the method disclosed herein may determine that the blinkers/flashers should be adapted in a certain way based on the vehicle surroundings, and when it is determined that a blinker should be activated, the characteristics of the blinker is adapted accordingly. Thus, a decision may be made to adapt a vehicle light even if the vehicle light is not currently used. Controlling the at least one display unit to adapt a vehicle light based on the collected data may thus be performed only when it has been determined that the vehicle light should be activated. The control device may be configured to determine when vehicle lights should be activated but this is not part of the invention per se. The control device may thus be configured to control the at least one display unit to show a standard set of lights associated with the operation of the vehicle. Such a standard set of lights may comprise headlights, rear lights, blinkers/flashers, brake lights etc. The control device may thus control the at least one display unit based on input from different vehicle systems regarding braking of the vehicle, intention to turn the vehicle and similar. The control device may thus be configured to control the at least one display unit to show the standard set of lights according to conventional methods for controlling vehicle lights. As an example, the control device may control the at least one display unit to show high beam/main beam/full beam headlights at the front end of the vehicle when it is dark outside and no other vehicles are present. In a similar way, the control device may control the at least one display unit to show fog lights when it is determined that it is foggy outside. The present disclosure relates to a method for adapting such standard set of lights to the surroundings and also to provide non-conventional vehicle lights based on what is happening in the surroundings of the vehicle. Alternatively, activation of vehicle lights may be determined by means of another control unit or system arranged in communication with the control device. The control device may thus receive instructions to activate a specific vehicle light, and the control device will then control the at least one display unit to show that vehicle light.

Collecting data relating to the vehicle surroundings may comprise collecting data relating to factors not associated with the operation of the vehicle. The data relating to vehicle surroundings may involve data, which in some way affect the visibility or perception of the vehicle lights. Collecting data relating to the vehicle surroundings may be performed by means of sensor devices arranged on the vehicle. Collecting the data may thus comprise receiving data from the sensor devices arranged on the vehicle. The control device may thus be arranged in communication with the sensor devices. Collecting data relating to the vehicle surroundings may also comprise receiving and collecting data relating to the vehicle surroundings from an external control center. The control device may save the collected data in a memory of the control device. The control device may collect data relating to the vehicle surroundings continuously or with predetermined intervals. The sensor devices may comprise cameras, LIDAR, radar, temperature sensors, rain sensors or similar. Based on the collected data, the control device may determine how to control the at least one display unit.

According to an example, the control device receives information from a leading vehicle of a platoon that the leading vehicle is about to brake. The control device may then control a display unit arranged at a last (rearmost) vehicle in the platoon to show extra braking lights or braking lights with adapted intensity, size, position and/or color. Collecting data relating to the vehicle surroundings may thus also comprise receiving/collecting data from other vehicles through V2V communication.

The control device controls the at least one display unit to adapt a vehicle light by sending instructions and/or control signals to the control unit of the at least one display unit. Thus, the control device determines that a vehicle light should be adapted and instructs the control unit of the at least one display unit to show the thus adapted vehicle light on the digital screen.

According to an example, the at least one display unit is controlled to adapt at least one vehicle light based on the current weather. The control device may thus control the at least one display unit to adapt at least one vehicle light based on data relating to the current weather. The collected data may thus comprise information about the current weather. Based on the collected data, the control device may determine the current weather and thereafter control the at least one display unit. In the event that the vehicle is operating when it is foggy, snowing or raining outside, for example the characteristics of the headlights, fog lights, rear lights and/or brake lights may be adapted, such that the lights are more distinguishable. This is also the case when the vehicle is operating in a sand storm or in areas with a lot of smoke or flying leaves affecting the visibility. This way, drivers in meeting/trailing/preceding vehicles may more easily detect the vehicle and safety is thereby increased. The at least one display unit may additionally or alternatively be controlled to adapt at least one vehicle light based on whether it is dark or light outside, thus whether it is night or day.

The at least one display unit may be controlled to adapt at least one vehicle light based on the current traffic situation. As an example, the vehicle may be operating in an urban environment with a lot of vehicles, cyclists and persons surrounding the vehicle. In such situation, it may be advantageous to improve the visibility of the vehicle lights. Traffic queues and roadwork may also be situations where adaption of vehicle lights to increase visibility would be advantageous. Also, in a traffic situation where the vehicle has entered a blind alley or a loading/unloading station where it is difficult to turn the vehicle around, the control device may control at least one display unit at a previous rear end of the vehicle, such that it shows front lights instead of rear lights. Similarly, the control device may control at least one display unit at a previous front end of the vehicle, such that it shows rear lights instead of front lights. In this way, the front and rear of the vehicle have changed, and the vehicle can be operated without having to turn it around. According to an example, the control device receives instructions from an external control center to change front and rear end of the vehicle. The control center and/or the control device may decide to change front/rear end of the vehicle based on the current traffic situation, data from navigation systems and the current mission of the vehicle. It is to be understood that for safety reasons, this function may not be used if the vehicle is surrounded by other vehicles/persons that would be affected by the change of front/rear end. Typically, change of front/rear end may be performed when the vehicle is operated in restricted areas, such as mining areas, airports, loading areas etc.

According to an example, the at least one display unit is controlled to adapt at least one vehicle light based on characteristics of a trailing vehicle. A trailing vehicle is a vehicle following behind the present vehicle comprising the vehicle lighting device as disclosed herein. Adapting the vehicle lights based on a trailing vehicle may be performed when the at least one display unit is arranged at a rear end of a vehicle. In the event that the following vehicle is a large/high vehicle, such as a truck, bus or construction vehicle, the control device may control the at least one display unit, such that the position of for example the rear lights and/or brake lights is higher up (in relation to the ground) on the at least one display unit. The position of at least one vehicle light at the rear of the vehicle may thus be temporarily raised, such that vehicles behind the following vehicle will be able to see the vehicle lights on the at least one display unit. As an example, the control device may comprise a predetermined height value saved in a memory and may compare a determined height of the trailing vehicle with this predetermined height value. The height of the trailing vehicle may be determined by means of the sensor devices. If the determined height exceeds the predetermined height value, the control device may control the at least one display unit, such that the at least one light is shown on a higher position. Alternatively, the control device may compare the determined height with a list of predetermined height values and corresponding positions for different lights saved in a database. The new temporary position of the at least one light may thus be determined by means of data mapping.

According to an example, controlling the at least one display unit to adapt at least one vehicle light based on the collected data comprises adapting the intensity of the vehicle light. Thus, controlling the at least one display unit to adapt at least one vehicle light based on the collected data may comprise changing the intensity of the vehicle light. For example, if the weather or the traffic situation is affecting the visibility of the vehicle lights, the control device may control the display unit to increase the intensity of the vehicle lights. As an example, when it is sunny outside it may be difficult to see, for example, the flashers and brake lights of a preceding vehicle. Thus, if the control device detects that it is sunny, display units on the vehicle may be controlled to show flashers and brake lights with increased light intensity. The at least one display unit may be configured to show a vehicle light with a predetermined normal light intensity, at least one predetermined increased light intensity, or at least one predetermined reduced light intensity, where the at least one increased and reduced light intensity are in relation to the normal light intensity. A list of predetermined surrounding factors, such as weather and traffic situation, together with corresponding predetermined light intensities may be saved in a database. The control device may thus determine how to control the at least one display unit with regard to light intensity by comparing the collected data for example from the sensor devices with the list in the database.

Additionally or alternatively, controlling the at least one display unit to adapt at least one vehicle light based on the collected data may comprise adapting the size of the vehicle light. Thus, controlling the at least one display unit to adapt at least one vehicle light based on the collected data may comprise changing the size of the vehicle light. For example, if the weather or the traffic situation is affecting the visibility of the vehicle lights, the control device may control the display unit to increase the size of the vehicle light. Alternatively, if there are cyclist or pedestrians in the surrounding, it may be advantageous to temporarily increase the size of the vehicle lights. This way, the visibility of the vehicle lights is increased as well as the awareness of the intentions of the vehicle driver. The at least one display unit may be configured to show a vehicle light in a predetermined normal size, at least one predetermined increased size, or at least one predetermined reduced size, where the at least one increased and reduced size are in relation to the normal size. A list of predetermined surrounding factors, such as weather and traffic situation, together with corresponding predetermined light sizes may be saved in a database. The control device may thus determine how to control the at least one display unit with regard to the size of the lights by comparing the collected data, for example from the sensor devices, with the list.

According to yet another example, controlling the at least one display unit to adapt at least one vehicle light based on the collected data comprises adapting the position of the vehicle light. Thus, controlling the at least one display unit to adapt at least one vehicle light based on the collected data may comprise changing the position of the vehicle light. As mentioned above, in the event that a trailing vehicle is relatively high and therefore prevents following vehicles from seeing the lights of the present vehicle, the control device may control the at least one display unit, such that the position of certain vehicle lights are moved upwards. Similarly, in the event that a trailing vehicle is relatively wide and therefore prevents following vehicles from seeing the lights of the present vehicle, the control device may control the at least one display unit, such that the positions of certain vehicle lights are moved laterally. Also, in the event that the present vehicle is standing in a long queue of vehicles, it may be advantageous to raise the position of certain vehicle lights. This way, the visibility of the vehicle lights is increased and trailing vehicles will be aware of the intentions of the present vehicle driver. The at least one display unit may be configured to show a vehicle light at a predetermined normal position or at least one predetermined laterally and/or vertically changed position, where the at least one laterally and/or vertically changed position is in relation to the normal position. A list of predetermined surrounding factors, such as weather and traffic situation, together with corresponding predetermined light positions may be saved in a database. The control device may thus determine how to control the at least one display unit with regard to the light position by comparing the collected data, for example from the sensor devices, with the list.

Controlling the at least one display unit to adapt at least one vehicle light based on the collected data may additionally or alternatively comprise adapting the color and/or the shape of a vehicle light.

Alternatively, the control device may, by means of machine learning, over time learn how to control the vehicle lighting device based on the surrounding factors. The control device may thus over time learn that the position of a certain light, the light intensity, color and/or the light size should be changed during certain surrounding conditions.

According to an aspect of the present disclosure, the method further comprises detecting a potentially dangerous situation; and controlling the at least one display unit to provide a visual alert. In the event that the control device detects a potentially dangerous situation, the control device may control the at least one display unit, such as to warn the surroundings. A potentially dangerous situation may be a school with children running out in the road, a suddenly braking preceding vehicle, an object in the roadway, animals running adjacent or across the road or similar. A potentially dangerous situation may also be that the vehicle gets a flat tire or for some other reason immediately has to stop. A bus leaving a bus stop may also be considered as a potentially dangerous situation. Furthermore, a potentially dangerous situation may be that a trailing vehicle is too high to pass under an upcoming bridge. In the event that the control device, for example by means of the sensor devices, determines that a trailing vehicle will not be able to pass under an upcoming bridge, the control device may control the at least one display unit to show an alert to the trailing vehicle. Such alert may comprise flashing lights and/or a warning text. The control device may detect that a potentially dangerous situation has arisen based on collected data from the sensor devices and/or from a control center or other vehicles. As an example, the control device may comprise a list of predetermined data indicating a potentially dangerous situation saved in a database. The control device may thus compare the collected data with the list to detect a potentially dangerous situation. When the control device has detected a potentially dangerous situation, the control device may control the at least one display unit to provide flashing lights, warning signs or lights that immediately get attention from people in the surrounding. The control device may also control the at least one display unit to adapt the color of a vehicle light. The control device may also learn over time, by means of machine learning, to activate a visual alert during certain conditions.

According to an example, a potentially dangerous situation is an object appearing in front of the vehicle. That an object, not being another vehicle, appears in front of the vehicle may be detected by means of the sensor devices on the vehicle. The object is suitably a moving object, such as a person, an animal or cyclist. The object appearing in front of the vehicle thus has to be of a size within a predetermined range in order to constitute a potentially dangerous situation. As an example, the present vehicle may be standing behind a school bus. A child may step out into the street behind the bus, and thus in front of the present vehicle, to cross the street. Vehicles approaching from behind the present vehicle and vehicles approaching in the opposite lane may not notice the child and there is a high risk that an accident will happen. When the control device detects that an object appears in front of the vehicle, a visual alert may be shown on a display unit arranged at the front end of the vehicle to warn the object (person) and also to warn approaching vehicles in the opposite lane. At the same time, a visual alert may be shown on a display unit at the rear end of the vehicle, to warn the trailing vehicles. The visual alert may comprise flashing lights, a warning text, symbols, or similar. Similarly, a potentially dangerous situation may be an object appearing behind the vehicle. In the event that the present vehicle is, for example a bus, the control device may, by means of the sensor devices, detect that a person is stepping out in the street behind the present vehicle. The control device may then control a display unit arranged at the rear end of the vehicle to show a visual alert to warn the person behind the vehicle and to warn approaching trailing vehicles. At the same time, the control device may control a display unit arranged at the front end of the vehicle, to show a visual alert and thereby warn approaching vehicles in the opposite lane.

According to an example, the control device controls the at least one display unit to provide a visual alert in multiple steps. For example, the control device may first control the at least one display unit to show a warning sign on a screen. Subsequently, the control device may control the display unit to show a flashing warning. The control device may also activate an audible alert as a last step. In this way, the alert is increased stepwise.

By controlling the at least one display unit to adapt a vehicle light based on the vehicle surroundings and to provide visual alerts in the event of dangerous situations, the at least one display unit may function as a Human Machine Interface (HMI) or communications link between different vehicles and between vehicles and persons in the surroundings. For example, if the vehicle comprising the vehicle lighting device is a bus, the control device may control the at least one display unit to show time remaining until the bus leaves a bus stop, or time remaining before the doors are closed, etc. As another example, when the vehicle is stopping for people crossing the street, the control device may control the at least one display unit to indicate to vehicles approaching from behind that people are crossing the street. The control device may also control the at least one display unit to show a warning triangle or other symbol/sign as e.g. a brake light signalling good or bad behavior of a trailing vehicle driver based on sensor input, or operator input. This increases safety in the traffic.

According to an aspect of the present disclosure, the vehicle lighting device comprises two display units in the form of two foldable panels, wherein the method further comprises controlling the display units, such that the display units are folded out to form an aerodynamic tapered shape. The display units still show vehicle lights in the unfolded position. The display units may thus show vehicle lights in the folded position and in the unfolded position. The vehicle lighting device thus comprises two foldable panels. In this example, the two panels are arranged at the rear end of a vehicle. The two panels may be pivotally attached to the vehicle for example by means of hinges or similar. One panel may be right hinged and the other panel may be left hinged. In a normal folded position, the two panels may cover the rear end of the vehicle, such as two closed doors. The two panels may be configured to be moved to an unfolded position, also called extracted position or folded out position. In the unfolded position, each panel is arranged with an angle in the range of 10-80 degrees in relation to the rear end of the vehicle. In the folded position the angle is substantially zero. The angle of the two panels in the unfolded position may vary depending on current driving conditions. The angle may thus vary depending on vehicle speed, wind force, road condition and similar. The control device may continuously determine vehicle speed, wind force and road condition based on sensor input and thereby iteratively learn which angle is optimal for certain driving conditions. The control device may also receive information regarding the optimal angle from other vehicles or a control center by means of V2X or V2V communication. This will facilitate the machine learning. Thus, in the unfolded position, the two panels form an aerodynamic tapered shape of the rear end of the vehicle. This may also be referred to as a boat tail or trailer tail. By controlling the display units to form this trailer tail, drag from the wake created behind the vehicle is reduced and the fuel consumption may thereby be reduced. Also, by controlling the display units to an unfolded position, the distance between the rear end of the vehicle and a trailing vehicle may be increased, which increases safety. The control device may control the two display units to form a trailer tail when the vehicle is platooning.

According to an aspect of the present disclosure, a control device configured for controlling a vehicle lighting device is provided. The vehicle lighting device comprises at least one electronic display unit arranged at one end of the vehicle, wherein the control device is arranged to control the at least one display unit to show various types of vehicle lights. The control device is configured to collect data relating to the vehicle surroundings; and control the display unit to adapt a vehicle light based on the collected data.

It is to be understood that the control device performing the disclosed method may be implemented as a separate entity or distributed in two or more physical entities. The control device may comprise one or more control units and/or computers. The control device may thus be implemented or realized by the control device comprising a processor and a memory, the memory comprising instructions, which when executed by the processor, causes the control device to perform the herein disclosed method steps. The control device may form part of the external control center or it may be comprised in the vehicle.

It will be appreciated that all the embodiments described for the method aspect of the invention performed by the control device are also applicable to the control device aspect of the invention. That is, the control device may be configured to perform any one of the steps of the method according to the various embodiments described above.

The control device may thus be configured to adapt the intensity of a vehicle light. The control device may additionally or alternatively be configured to adapt the size, the color and/or the position of the vehicle light. The control device may also be configured to adapt the vehicle light based on the current weather, a current traffic situation and/or based on a trailing vehicle. The control device may also be configured to detect a potentially dangerous situation and control the display unit to provide a visual alert. The control device may be configured to control the at least one display unit to provide a visual alert when an object appears in front of the vehicle. In addition, the control device may be configured to control the display unit to provide a visual alert when an object appears behind the vehicle.

The control device may also be configured to control movement of the at least one display unit, such as to form an aerodynamic shape. The control device may furthermore be configured to control the display unit to show a registration number of the vehicle. The vehicle lighting device is thus also configured to show the registration number of the vehicle. The registration number may always be shown on the at least one display unit.

According to an example, the control unit is configured to control the at least one display unit to show traffic information. In the event that the vehicle is standing in a queue due to traffic jam or a traffic light, the control device may control the display unit, such that traffic information is shown on the display. This is particularly advantageous when the at least one display unit is arranged at the rear end of a vehicle. In this way, following vehicles can see information about what is causing the queue or similar. Current speed limits may also be displayed on the at least one display unit to increase safety. The control device may be arranged in communication with traffic systems of various kinds and may therefore receive traffic information, which may be displayed on the at least one display unit. The control device may furthermore be configured to control the at least one display to show advertising or company specific information.

The present disclosure also relates to a computer program comprising instructions which, when the program is executed by a computer, causes the computer to carry out the method disclosed above. The present disclosure further relates to a non-transitory computer-readable medium comprising instructions, which when executed by a computer causes the computer to carry out the method disclosed above.

According to an aspect of the present disclosure, a vehicle lighting device is provided, comprising at least one electronic display unit adapted to be arranged at one end of a vehicle. The vehicle lighting device further comprises a control device as disclosed herein. The vehicle lighting device may comprise a plurality of display units, each controllable by the control device. The display unit(s) of the vehicle lighting device may be integrated in the vehicle body or it may be removably attached to the rear or front end of the vehicle.

According to another aspect of the present disclosure, a vehicle is provided. The vehicle comprises a vehicle lighting device as mentioned above. The vehicle may be autonomously operated. The vehicle may comprise two display units, one at each end of the vehicle. According to an example, what is the front of the vehicle and the rear of the vehicle is changeable by means of controlling the display units. Since the display units are controllable to show various kinds of vehicle lights, it is possible to change which display unit(s) shows front lights and which shows rear lights. Thus, one end of the vehicle may be determined to be the front of the vehicle and the control device may thereby control the display unit(s) on that side of the vehicle to show front lights. Similarly, the control device controls the display units on the rear side of the vehicle to show rear lights. However, in the event that the vehicle has entered a blind alley or is in a traffic situation where it is difficult to turn the vehicle around, the control device may determine to make the previous rear end of the vehicle the front end. This is performed by controlling the display units at the previous rear end to instead show front lights, and vice versa. This way, the vehicle does not have to be turned around and operation of the vehicle is thereby facilitated.

The vehicle may be assembled from a set of modules and may comprise at least one drive module and at least one functional module. The at least one drive module may comprise a pair of wheels and may be configured to be autonomously operated and drive the assembled vehicle. The at least one display unit of the vehicle lighting device may be arranged on the at least one drive module and/or on the at least one functional module. In one example, the vehicle lighting device comprises two display units, one arranged on each end of the vehicle. According to an example, the vehicle comprises one functional module and two drive modules, one drive module arranged at each end of the functional module. The vehicle lighting device may thus comprise at least four display units. One display unit may be arranged at each end of the functional module, and each drive module may comprise a display unit. The display units of the vehicle lighting device may be integrated in the respective module. By using display units on the drive modules instead of conventional lamps, the same drive module can be used at the front of a vehicle and at the rear of a vehicle.

Assembling a vehicle from a set of modules makes it possible to dynamically assemble a modularized vehicle depending on a current mission or function to be performed. In this way, from the same set of modules, for example a truck, a garbage truck, a bus or a snowplough can be assembled. Not only will this result in an increased flexibility, but the cost for a vehicle owner will decrease significantly compared to having a plurality of different vehicles for different applications. By using at least one autonomously operated drive module, the drive module may autonomously/automatically perform physical connection and electrical connection with a second module. In this way, no manual work is required and the assembly of the vehicle is less cumbersome and much more time efficient.

The set of modules from which the vehicle is assembled may comprise a plurality of drive modules and a plurality of functional modules. The different drive modules of the set of modules may be identical or the drive modules may for example have different types/sizes of wheels, different suspension, different power capacity and/or different charge capacity. In one example, each drive module comprises a body provided with a pair of wheels arranged on two opposite sides of the drive module. In an example, the drive module has only one pair of wheels. Each drive module comprises at least one propulsion unit connected to the pair of wheels. The propulsion unit may be an electric machine, connected to the wheels. The pair of wheels of the drive module may thus be referred to as drive wheels. In one example, the drive module(s) comprises two electrical machines, one connected to each wheel. The electric machines may be arranged in the rim of the wheels. The wheels of the drive module can thus be driven independently of each other. The electric machines may also work as generators and generate electric power when braking the wheels. The drive module may also comprise a steering system connected to the wheels. This way, the drive module is steerable. The drive module may also comprise a brake system for braking the wheels. Suitably, the brake system comprises a wheel brake for each wheel of the drive module. Redundancy is achieved in that the drive module can be steered by means of the electrical machines and/or the wheel brakes in the event that the steering system malfunctions. In one example, the drive module further comprises at least one energy storage unit for providing the propulsion unit with energy. The energy storage unit may be an electric battery. The electric battery may be rechargeable. The drive module being configured to be autonomously operated means that the drive module comprises a plurality of sensors and systems for steering and driving the drive module automatically as an independent unit according to conventional methods. According to an example, the drive module comprises a navigation system and sensors for detecting objects in the surroundings of the drive module. The drive module may be referred to as an autonomously operated vehicle in the sense that it is allowed to operate on public roads.

Each functional module of the set of modules is configured to perform a predetermined function while being part of an assembled vehicle. In one example, the functional module is configured to accommodate or support a load. The functional module may be configured for accommodating passengers and may thus form a bus together with at least one drive module. The functional module may alternatively be configured for transporting goods and may thus form a truck together with at least one drive module. The functional module may be any of a garbage truck body, a loading platform, a fork arrangement for a forklift, and a snow-plough. The functional module may comprise trailing wheels, which are not driven or steerable. A functional module cannot move on its own but needs to be connected to at least one drive module to be able to move, the functional module and the drive module thereby together forming a vehicle. The functional module may comprise an energy storage unit, such as a battery.

Each module of the set of module may also comprise interfaces for electrical and physical connection to other modules.

According to an example, a control center receives information about at least one requested function/mission to be performed by an assembled modularized vehicle. The control center may also be referred to as an off-board system and may be configured for fleet management, vehicle assembly/disassembly and/or similar. The control center is thus arranged geographically at a distance from the modules and the assembled vehicle(s). In one example the control center receives the information about the at least one function/mission to be performed from an operator via a user interface, such as a touch screen, keyboard or similar. In another example, the information regarding the function/mission is automatically obtained by the control center by means of for example Artificial Intelligence, based on requested functions/missions to be performed. When the control center has information about a function/mission to be performed, the control center may determine what type of vehicle is required to perform said function/mission. The control center may select modules to form the assembled vehicle based on the function to be performed by the assembled vehicle. The control center then transmits signals to the modules with the command of connecting physically with each other. The control center may also transmit instructions to the modules to connect electrically with each other. When the assembled vehicle has performed the mission/function, the vehicle owner may determine to disassemble the vehicle, for example in order to reuse one or more of the modules to assemble another type of vehicle.

According to an aspect of the present disclosure, a vehicle is provided. The vehicle comprises at least two foldable panels arranged at an end of the vehicle, wherein the at least two foldable panels are configured to be unfolded to form an aerodynamic tapered shape. The at least two foldable panels may be arranged in communication with a control device, wherein the control device is configured to control the at least two foldable panels. According to an example, the at least two foldable panels comprises electronic display units configured to show vehicle lights and/or traffic information. The display units may be integrated in the at least two foldable panels. The display units may be configured as the display units of the vehicle lighting device disclosed herein.

According to another example, the at least two foldable panels are transparent. The vehicle may further comprise a vehicle lighting device comprising at least one electronic display unit as disclosed herein and the transparent panels may be arranged, such that they cover the at least one display unit when being in a folded position. The transparent panels are thus arranged on the outside of the at least one display unit. The foldable panels will thus not affect the visibility of the vehicle lights.

The at least two foldable panels may be referred to as screens or doors or similar. The at least two panels may be arranged at a rear end of a vehicle. The two panels may be pivotally attached to the vehicle for example by means of hinges or similar. One panel may be right hinged and the other panel may be left hinged. In a normal folded position, the two panels may be abutting the rear end of the vehicle and may be essentially parallel with the rear end of the vehicle. In the unfolded position, also called extracted position or folded out position, the at least two panels may be arranged with an angle in relation to the rear end side of the vehicle. The angle may be within the range of 20-80 degrees. The angle may vary depending on current driving conditions. The angle may thus vary depending on vehicle speed, wind force, road condition and similar. The control device may be configured to continuously determine vehicle speed, wind force and road condition and thereby iteratively learn which angle is optimal for certain driving conditions. The control device may also be configured to receive information regarding the optimal angle from other vehicles or a control center by means of V2X or V2V communication. This will facilitate the machine learning. Thus, in the unfolded position the two panels form an aerodynamic tapered shape. This may also be referred to as a boat tail or trailer tail. By controlling the at least two panels to form this trailer tail, drag from the wake created behind the vehicle is reduced and the fuel consumption may thereby be reduced. Also, by controlling the at least two panels to an unfolded position the distance to trailing vehicle may be increased, which increases safety. The vehicle may be a platooning vehicle. The vehicle may be autonomously operated.

The present disclosure will now be further illustrated with reference to the appended figures.

The term "link" refers herein to a communication link, which may be a physical connection such as an optoelectronic communication line, or a non-physical connection such as a wireless connection, e.g. a radio link or microwave link.

FIG. 1 schematically illustrates a vehicle 1 according to an example. The vehicle 1 is provided with a vehicle lighting device 100 comprising a control device 10 and at least one electronic display unit 20. In this figure, the vehicle 1 has one display unit 20 at a rear end 12 of the vehicle 1 and one display unit 20 at a front end 14 of the vehicle 1. It is, however, to be understood that the vehicle lighting device 100 may comprise a larger or smaller number of display units 20. The vehicle lighting device 100 will be further described in FIG. 2. The vehicle 1 may be a manually operated vehicle or an autonomously operated vehicle. In the event that the vehicle 1 is autonomously operated and does not include a cab, the display unit 20 arranged at the front end 14 of the vehicle 1 may cover substantially the entire front end 14 of the vehicle 1.

The vehicle 1 may be assembled from a set of modules and may comprise at least one drive module 30 and at least one functional module 40. The at least one drive module 30 may comprise a pair of wheels 32 and may be configured to be autonomously operated and drive the assembled vehicle 1. The at least one display unit 20 of the vehicle lighting device 100 may be arranged on the at least one drive module 30 and/or on the at least one functional module 40.

Figure 2:
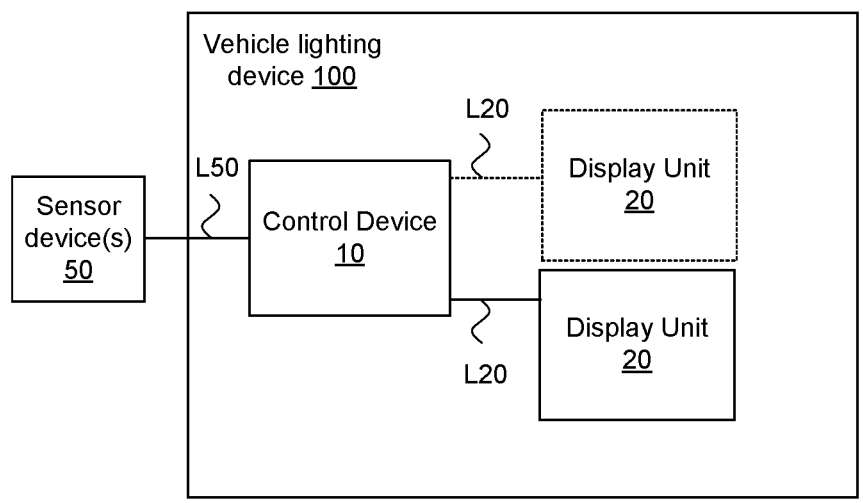
FIG. 2 schematically illustrates a vehicle lighting device according to example.

FIG. 2 schematically illustrates a vehicle lighting device 100 according to an example. The vehicle lighting device 100 in FIG. 2 comprises a control device 10 and at least one electronic display unit 20. In this figure, the vehicle lighting device 100 comprises two display units 20 but it is to be understood that the vehicle lighting device 100 may comprise any number of display units 20. The control device 10 is arranged in communication with the display units 20 via a respective link L20. The display units 20 may comprise a control unit (not shown) and the control device 100 may thus be arranged in communication with the control unit of the display units 20. The control device 100 may be configured to control the display units 20 to show a variety of vehicle lights. If the display unit 20 is arranged at the front end 14 of the vehicle 1 as disclosed in FIG. 1, the control device 100 is configured to control the display unit 20 to show headlights, blinkers/flashers etc. If the display unit 20 is arranged at the rear end 12 of a vehicle 1 as disclosed in FIG. 1, the control device 100 is configured to control the display unit 20 to show rear lights, brake lights etc. Thus, each display unit 20 is configured to show a plurality of different vehicle lights.

The display units 20 may comprise a digital screen, such as a plasma or an LCD screen. The display units 20 may comprise flexible displays. They may be bent around the sides of the vehicle 1. The display units 20 may be integrated in the rear end 12 or front end 14 of the vehicle 1 or it may be removably attached to the rear end 12 or the front end 14.

The control device 100 may be implemented as a separate entity or distributed in two or more physical entities. The control device 100 may comprise one or more computers. The control device 100 is configured to collect data relating to the vehicle surroundings for example by means of sensor devices 50 arranged on the vehicle 1. The control device 100 is thus arranged in communication with sensor devices 50 via a link L50. The control device 100 may also be configured to control the display units 20 to adapt a vehicle light based on the collected data. The control device 100 may be configured to control the display units 20 to adapt a vehicle light by transmitting instructions/control signals to the control unit of the display units 20.

The control device 100 may be configured to adapt the intensity of a vehicle light. The control device 100 may additionally or alternatively be configured to adapt the size and/or the position of the vehicle light. The control device 100 may also be configured to adapt the vehicle light based on the current weather, a current traffic situation and/or based on a trailing vehicle. The control device 100 may also be configured to detect a potentially dangerous situation and control at least one display unit 20 to provide a visual alert. The control device 100 may be configured to control at least one display unit 20 to provide a visual alert when an object appears in front of the vehicle 1. In addition, the control device 100 may be configured to control a display unit 20 to provide a visual alert when an object appears behind the vehicle 1.

According to an example, the vehicle lighting device 100 comprises two display units 20 in the form of two foldable panels arranged at a rear end 12 of a vehicle 1. In this case, the control device 100 may also be configured to control the display units 20, such that the display units 20 are folded out to form an aerodynamic tapered shape at the rear end of the vehicle 1.

The control device 100 may furthermore be configured to control the display units 20 to show a registration number of the vehicle 1. The vehicle lighting device 100 is thus also configured to show the registration number of the vehicle 1.

According to an example, the control unit 100 is configured to control a display unit 20 to show traffic information. The control device 100 may thus be arranged in communication with traffic systems of various kinds so as to receive traffic information, which may be displayed on a display unit 20. The control device 100 may furthermore be configured to control a display unit 20 to show advertising or company specific information.

FIGS. 3a-3f schematically illustrate a display unit 20 of a vehicle lighting device 100 according to different examples. The vehicle lighting device 100 may be configured as disclosed in FIG. 2 and may be arranged on a vehicle 1 as disclosed in FIG. 1. The display unit 20 may be adapted to be arranged at a front end 14 of a vehicle 1 or a rear end 12 of a vehicle 1.

Figure 3A:
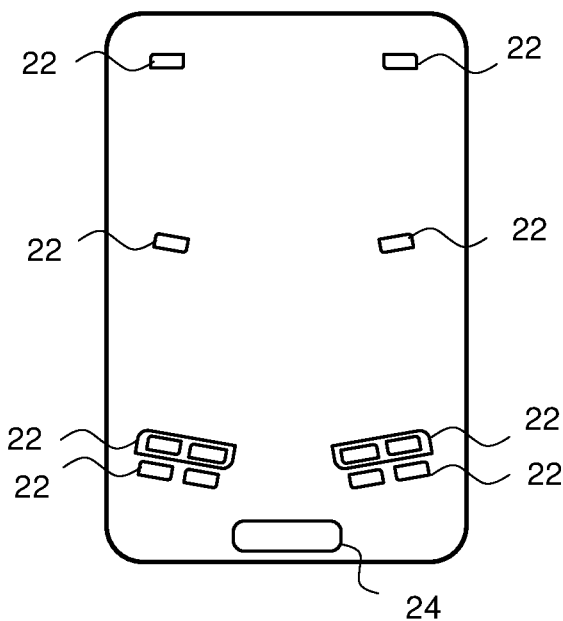
FIG. 3a-f schematically illustrate a display unit of a vehicle lighting device according to different examples.

FIG. 3a illustrates the display unit 20 showing a plurality of different vehicle lights 22 in a normal state. The vehicle lights 22 may be headlights, blinkers, rear lights, brake lights, fog lights etc. The display unit 20 also shows a registration number 24 of the vehicle 1. The different vehicle lights 22 have different positions on the display unit 20, corresponding to the positions of conventional vehicle lamps.

Figure 3B:
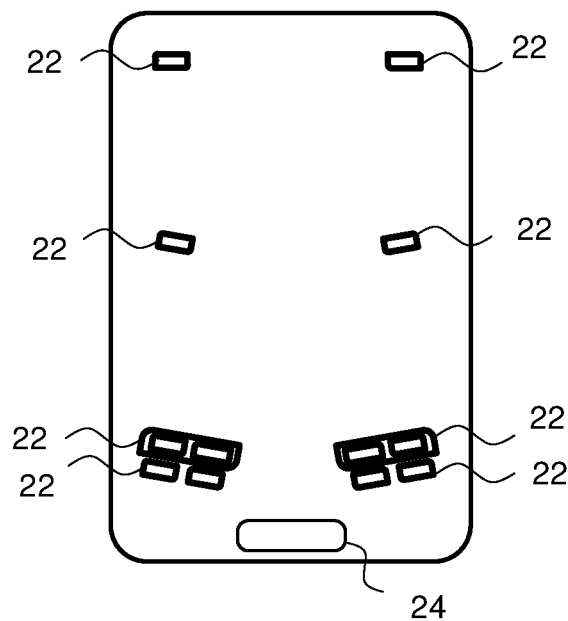

In FIG. 3b, the display unit 20 is controlled to adapt at least one vehicle light 22 to the vehicle surroundings. In this example, the display unit 20 is controlled to adapt the light intensity of at least one vehicle light 22. In the figure, all vehicle lights 22 have increased light intensity compared to the normal state. It is, however, to be understood that one or more of the lights may be adapted at the same time. Also, the display unit 20 may be adapted to show at least one vehicle light 22 with decreased light intensity.

Figure 3C:
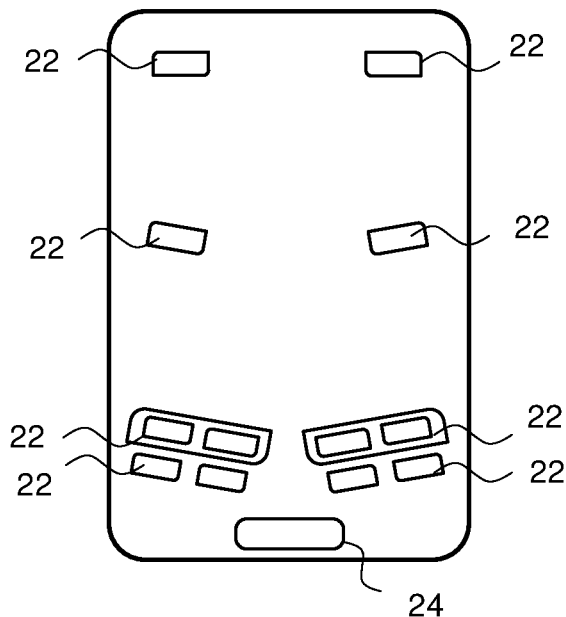

FIG. 3c illustrates a situation where the display unit 20 is controlled to adapt the size of at least one vehicle light 22. In the figure, all vehicle lights 22 have increased size compared to the normal state. It is, however, to be understood that one or more of the lights may be adapted at the same time. Also, the display unit 20 may be controlled to show at least one vehicle light 22 with reduced size.

Figure 3D:
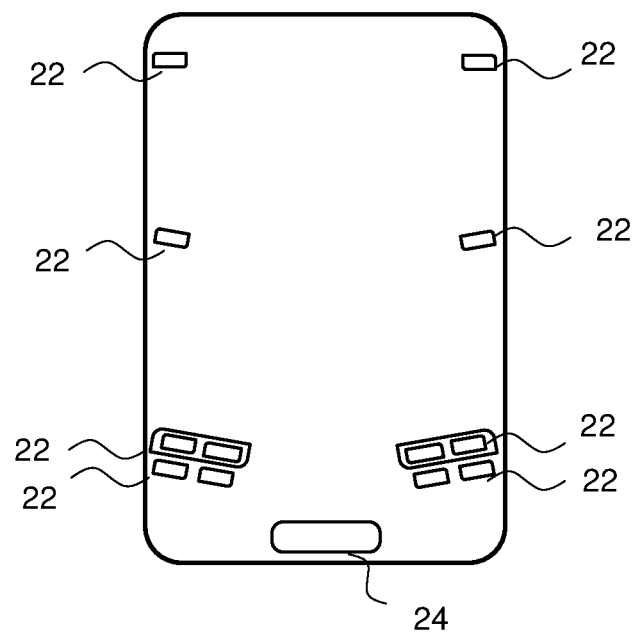

FIG. 3d illustrates a situation where the display unit 20 is controlled to adapt the position of at least one vehicle light 22. In the figure, all vehicle lights 22 have a new position moved laterally outwards compared to the normal state. It is, however, to be understood that one or more of the lights may be adapted at the same time. Also, the display unit 20 may be controlled to show at least one vehicle light 22 with a new position moved laterally inwards.

Figure 3E:
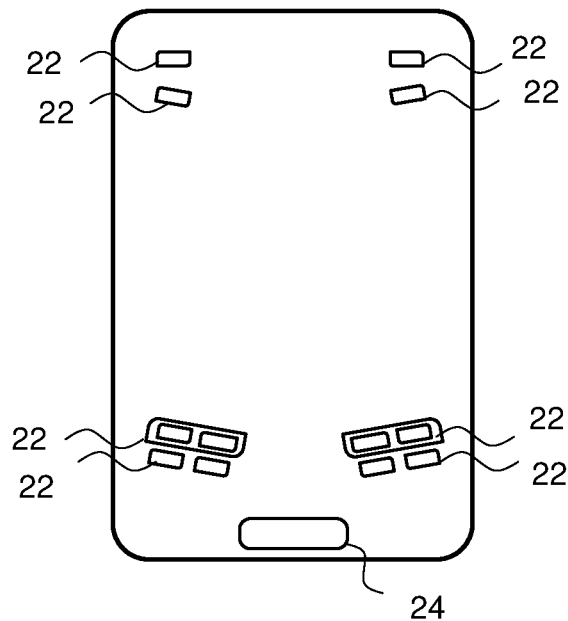

FIG. 3e illustrates a situation where the display unit 20 is controlled to adapt the position of at least one vehicle light 22. In the figure, two vehicle lights 22 have a new position moved vertically upwards compared to the normal state.

The position of the vehicle lights 22 have thus been raised. It is, however, to be understood that one or more of the lights may be adapted at the same time. Also, the display unit 20 may be controlled to show at least one vehicle light 22 with a new position moved vertically downwards.

Figure 3F:
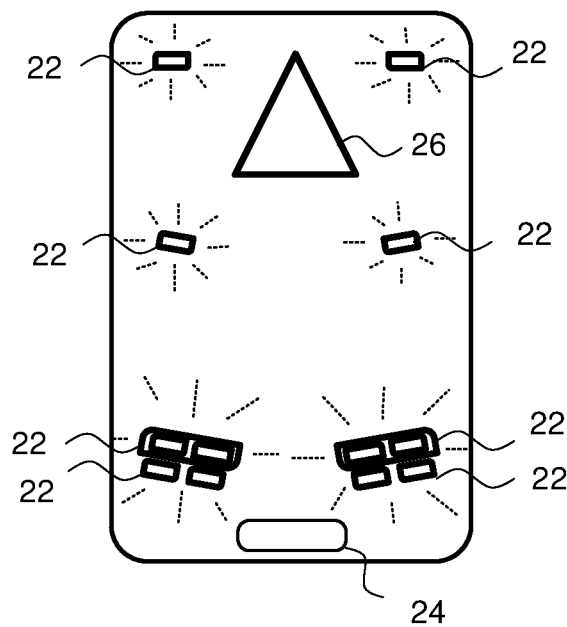

FIG. 3f illustrates a situation where the control device 100 has detected a potentially dangerous situation and controls the display unit 20 to provide a visual alert. In the figure, the standard vehicle lights 22 have increased light intensity and flashes. Also, the display unit 20 is controlled to provide a warning sign 26, herein illustrated as a warning triangle. This way, the surrounding vehicles/persons are made aware that something is happening.

Figure 4A:
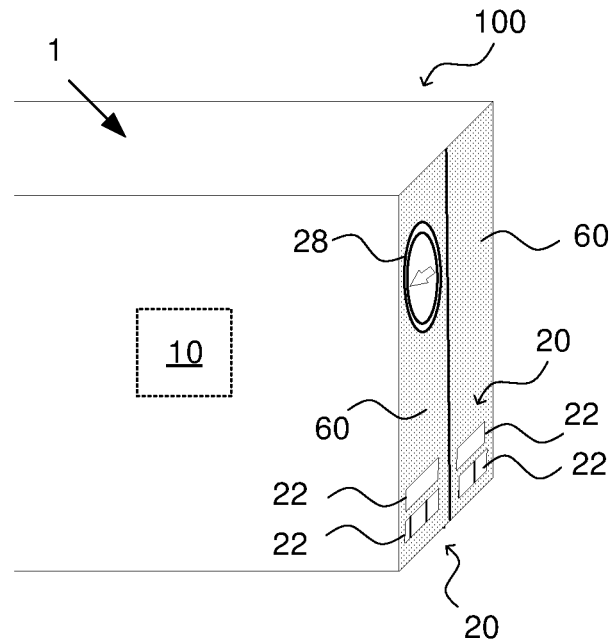
FIG. 4a-b schematically illustrate a vehicle according to an example.
Figure 4B:
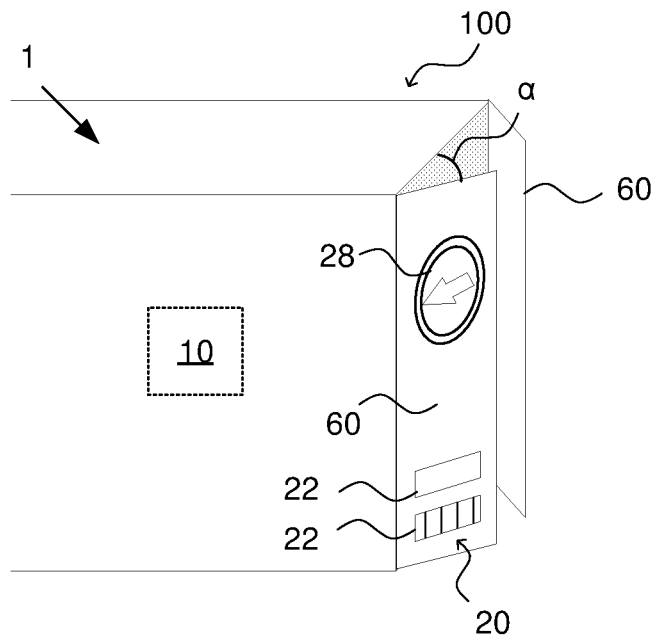

FIGS. 4a-4b illustrate a part of a vehicle 1 according to an example. The vehicle 1 may be configured as disclosed in FIG. 1 and may thus comprise a vehicle lighting device 100 as disclosed in FIG. 2. The vehicle 1 further comprises two foldable panels 60 arranged at an end of the vehicle 1, wherein the panels 60 are configured to be unfolded to form an aerodynamic tapered shape. In FIG. 4a the panels 60 are in a folded position and in FIG. 4b the panels 60 are in the unfolded position.

The panels 60 may be referred to as screens or doors or similar. The panels 60 may be arranged at a rear end 12 of the vehicle 1. The panels 60 may be arranged in communication with a control unit (not shown), wherein the control unit is configured to control the movement of the foldable panels 60. The control unit may be part of the control device 10 of the vehicle lighting device 100.

According to an example, the foldable panels 60 comprises electronic display units 20 of the vehicle lighting device 100. The display units 20 are thus configured to show vehicle lights 22 and/or traffic information 28. The display units 20 may be integrated in the foldable panels 60.

According to another example, the foldable panels 60 are transparent. The transparent panels 60 may be arranged, such that they cover a display unit 20 of the vehicle lighting device 100 when being in a folded position. The transparent panels are thus arranged on the outside of the display unit 20. The foldable panels 60 will thus not affect the visibility of the vehicle lights.

The panels 60 may be pivotally attached to the vehicle 1 for example by means of hinges or similar. One panel 60 may be right hinged and the other panel 60 may be left hinged. In the folded position, the two panels 60 may be abutting the end of the vehicle 1 and may be essentially parallel with the end of the vehicle 1. In the unfolded position, also called extracted position or folded out position, the panels 60 may be arranged with an angle α in relation to the end of the vehicle 1. The angle α may be within the range of 10-80 degrees. The angle α may vary depending on current driving conditions. The angle α may thus vary depending on vehicle speed, wind force, road condition and similar. The control unit controlling the movement of the panels 60 may be configured to continuously determine vehicle speed, wind force and road condition and thereby iteratively learn which angle α is optimal for certain driving conditions. The control unit may also be configured to receive information regarding the optimal angle α from other vehicles or a control center by means of V2X or V2V communication. By controlling the panels 60 to form an aerodynamic shape, drag from the wake created behind the vehicle 1 is reduced and the fuel consumption may thereby be reduced. The vehicle 1 may be a platooning vehicle. The vehicle 1 may be autonomously operated.

Figure 5A:
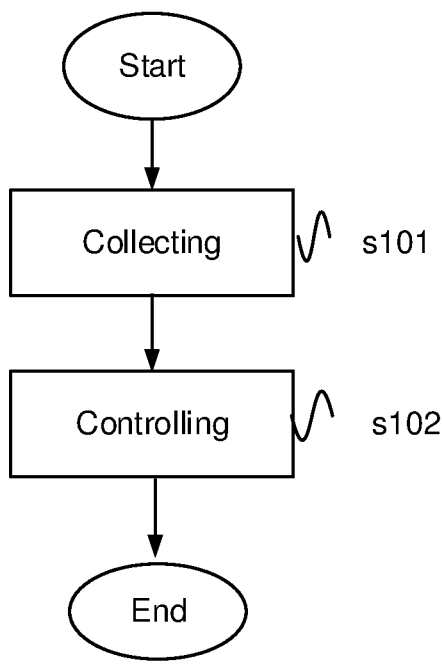
FIG. 5a-c illustrates flow charts for a method for controlling a vehicle lighting device according to an example.

FIG. 5a illustrates a flow chart for a method, performed by a control device 10, for controlling a vehicle lighting device. The vehicle lighting device 100 is configured as disclosed in FIG. 2 and FIGS. 3a-f and thus comprises the control device 10 and at least one electronic display unit 20 arranged at one end of a vehicle 1. The control device 10 is arranged to control the at least one display unit 20 to show various types of vehicle lights 22. The method comprises: collecting s101 data relating to the vehicle surroundings; and controlling s102 the at least one display unit 20 to adapt at least one vehicle light 22 based on the collected data. The steps of this method may be performed continuously or at predetermined intervals.

Controlling s102 the at least one display unit 20 to adapt at least one vehicle light 22 based on the collected data may comprise controlling the at least one display unit 20 to adapt/change the characteristics of at least one vehicle light 22, such that the vehicle light 22 is more distinguishable/noticeable/perceptible.

Collecting s101 data relating to the vehicle surroundings may comprise collecting data relating to factors not associated with the operation of the vehicle 1. The data relating to vehicle surroundings may involve data, which in some way affect the visibility or perception of the vehicle lights. Collecting s101 data relating to the vehicle surroundings may be performed by means of sensor device 50 arranged on the vehicle 1. Collecting s101 the data may comprise receiving data from the sensor devices 50 arranged on the vehicle 1. Collecting s101 the data may comprise receiving data from an external control center or other vehicles. The control device 10 may collect s101 data relating to the vehicle surroundings continuously or with predetermined intervals.

The control device 10 controls the at least one display unit 20 to adapt a vehicle light 22 by transmitting instructions and/or control signals to a control unit of the at least one display unit 20. The control unit then controls what is shown by the display unit.

Controlling s102 the at least one display unit 20 may comprise adapting at least one vehicle light 22 based on the current weather. The control device 10 may thus control the at least one display unit 20 to adapt at least one vehicle light 22 based on data relating to the current weather. Based on the collected data, the control device 10 may determine the current weather and thereafter control s102 the at least one display unit 20.

Controlling s102 the at least one display unit may comprise adapting at least one vehicle light 22 based on the current traffic situation. As an example, the vehicle 1 may be operating in an urban environment with a lot of vehicles, cyclists and persons surrounding the vehicle 1. In such a situation, it may be advantageous to improve the visibility of the vehicle lights. Traffic queues and roadwork may also be situations where adaption of vehicle lights to increase visibility would be advantageous.

Controlling s102 the at least one display unit 20 may comprise adapting at least one vehicle light 22 based on characteristics of a trailing vehicle. A trailing vehicle is a vehicle following behind the present vehicle 1 comprising the vehicle lighting device 100. Adapting the vehicle lights 22 based on a trailing vehicle may be performed when the at least one display unit 20 is arranged at a rear end 12 of a vehicle 1. In the event that the following vehicle is a large/high vehicle, such as a truck, bus or construction vehicle, the control device 10 may control the at least one display unit 20, such that the position of for example the rear lights and/or brake lights is higher up (in relation to the ground) on the at least one display unit 20. The position of at least one vehicle light 22 at the rear of the vehicle 1 may thus be temporarily raised, such that vehicles behind the trailing vehicle will be able to see the vehicle lights 22 on the at least one display unit 20. As an example, the control device 10 may comprise a predetermined height value saved in a memory and may compare a determined height of the trailing vehicle with this predetermined height value. The height of the trailing vehicle is determined by means of the sensor devices 50. If the determined height exceeds the predetermined height value, the control device 10 may control the at least one display unit 20, such that the at least one light 22 is shown on another position. Alternatively, the control device 10 may compare the determined height with a list of predetermined height values and corresponding positions for different lights saved in a database. The new temporary position of the at least one vehicle light 22 may thus be determined by means of data mapping.

According to an example, controlling s102 the at least one display unit 20 to adapt at least one vehicle light 22 based on the collected data comprises adapting the intensity of the vehicle light 22. A list of predetermined surrounding factors, such as weather and traffic situation, together with corresponding predetermined light intensities may be saved in a database. The control device 10 may thus determine how to control s102 the at least one display unit 20 with regard to light intensity by comparing the collected data from the sensor devices 50 with the list.

Controlling s102 the at least one display unit 20 to adapt at least one vehicle light 22 based on the collected data may comprise adapting the size of the vehicle light 22. Thus, controlling s102, the at least one display unit 20 to adapt at least one vehicle light 22 based on the collected data may comprise changing the size of the vehicle light 22. A list of predetermined surrounding factors, such as weather and traffic situation, together with corresponding predetermined light sizes may be saved in a database. The control device 10 may thus determine how to control s102 the at least one display unit 20 with regard to the size of the lights 22 by comparing the collected data from the sensor devices 50 with the list.

Controlling s102 the at least one display unit 20 to adapt at least one vehicle light 22 based on the collected data may comprise adapting the position of the vehicle light 22. Thus, controlling s102, the at least one display unit 20 to adapt at least one vehicle light 22 based on the collected data may comprise changing the position of the vehicle light 22. A list of predetermined surrounding factors, such as weather and traffic situation, together with corresponding predetermined light positions may be saved in a database. The control device 10 may thus determine how to control s102 the at least one display unit 20 with regard to the light position by comparing the collected data from the sensor devices 50 with the list.

According to an example, the vehicle lighting device 100 comprises two display units 20, one arranged at each end 12, 14 of the vehicle 1. Controlling s102 the at least one display unit 20 to adapt at least one vehicle light 22 based on the collected data may then comprise controlling the display units 20, such that the front end 14 of the vehicle 1 becomes the rear end 12 and vice versa. Thus, controlling s102 the at least one display unit 20 may comprise changing what is the front end of the vehicle 1 and what is the rear end of the vehicle 1. This may be advantageous in traffic situations where the vehicle 1 has entered a blind alley or a loading/unloading station where it is difficult to turn the vehicle 1 around. The control device 10 may thus control at least one display unit 20 at a previous rear end 12 of the vehicle 1, such that it shows front lights instead of rear lights. Similarly, the control device 10 may control at least one display unit 20 at a previous front end 14 of the vehicle 1, such that it shows rear lights instead of front lights.

Figure 5B:
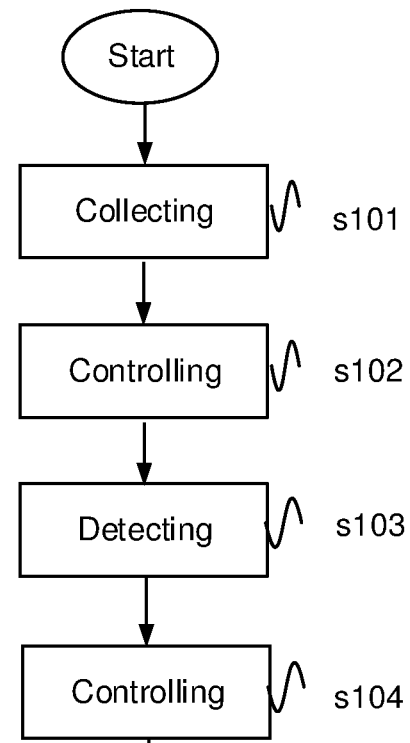

FIG. 5b illustrates a flow chart for a method, performed by a control device 10, for controlling a vehicle lighting device. The vehicle lighting device 100 is configured as disclosed in FIG. 2 and FIGS. 3a-f. The method comprises the method steps as disclosed in FIG. 5a. In addition the method comprises detecting s103 a potentially dangerous situation; and controlling s104 the at least one display unit 20 to provide a visual alert. A potentially dangerous situation may be a school with children running out in the road, a suddenly braking preceding vehicle, an object in the roadway or similar. The control device 10 may detect s103 that a potentially dangerous situation has arisen based on data from the sensor devices 50. As an example, the control device 10 may comprise a list of predetermined data indicating a potentially dangerous situation saved in a database. The control device 10 may thus compare the collected data from the sensor devices 50 with the list to detect a potentially dangerous situation. When the control device 10 has detected a potentially dangerous situation, the control device 10 may control s104, the at least one display unit 20, to provide flashing lights, warning signs or lights that immediately gets attention from people in the surrounding.

Figure 5C:
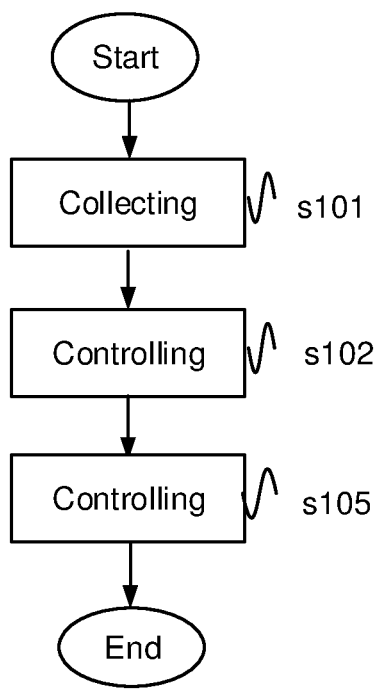

FIG. 5c illustrates a flow chart for a method, performed by a control device 10, for controlling a vehicle lighting device. The vehicle lighting device 100 is configured as disclosed in FIG. 2 and FIGS. 3a-f. The method comprises the method steps as disclosed in FIG. 5a. In this example, the vehicle lighting device 100 comprises two display units 20 in the form of two foldable screens or panels. The method further comprises controlling s105 the display units 20, such that they are folded out to form an aerodynamic tapered shape. The method thus comprises controlling s105 the display units 20 to form a trailer tail.

The control device 10 may control movement of the display units 20 by means of actuators arranged in physical contact with the display units 20. The actuators may be hydraulic, pneumatic, electrical or similar. The control device 10 controls 105 the display units 20, such that in the unfolded position, they are arranged with an angle in the range of 10-80 degrees in relation to the end of the vehicle 1. The angle of the display units 20 in the unfolded position may vary depending on current driving conditions. The angle may thus vary depending on vehicle speed, wind force, road condition and similar. The control device 10 may continuously determine vehicle speed, wind force and road condition and thereby iteratively learn which angle is optimal for certain driving conditions. The control device 10 may also receive information regarding the optimal angle from other vehicles or a control center by means of V2X or V2V communication.

Figure 6:
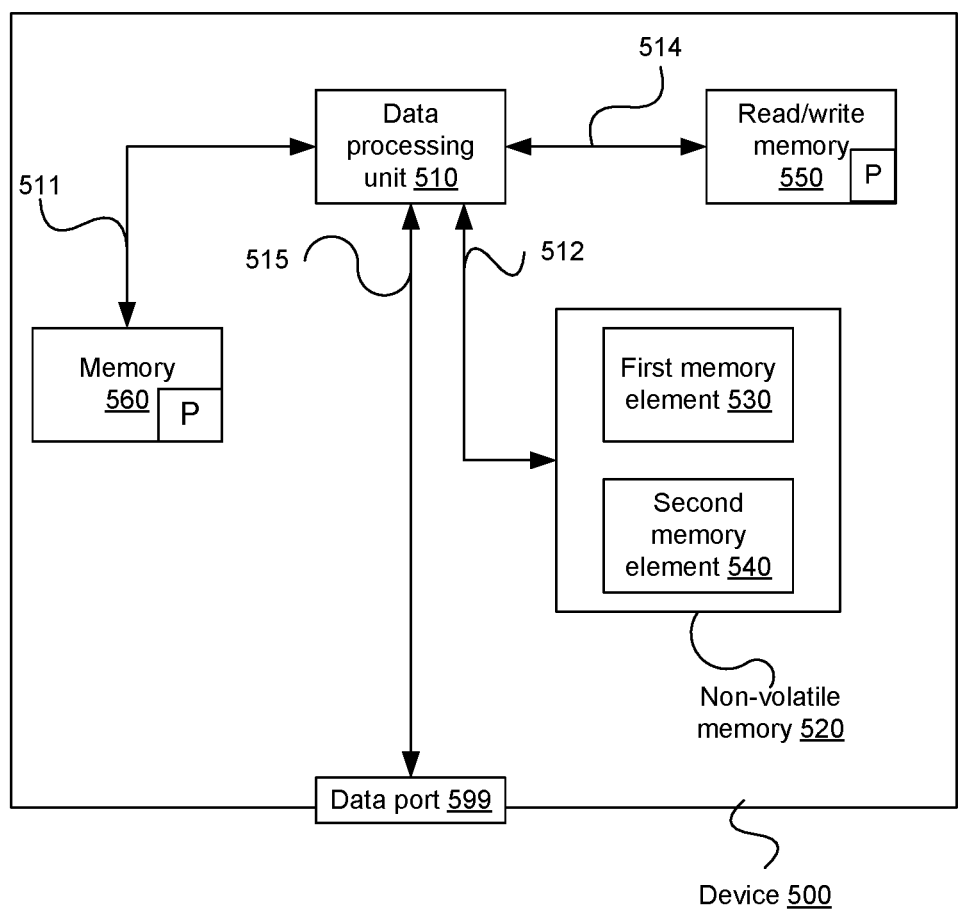
FIG. 6 schematically illustrates a control device or computer according to an example.

FIG. 6 is a diagram of a version of a device 500. The control device 10 described with reference to FIG. 1 and FIG. 2 may in a version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

A computer program P, is provided which comprises routines for replacing a first module of a vehicle with a new module. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510, which runs the programme stored in the memory 560 or the read/write memory 550. When the device 500 runs the programme, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method, performed by a control device, for controlling a vehicle lighting device, wherein the vehicle lighting device includes the control device and at least one outward-facing digital screen arranged at one end of a vehicle,
    wherein the control device is arranged to control the at least one outward-facing digital screen to show various types of vehicle lights, the method comprising:
    collecting data relating to vehicle surroundings; and
    controlling the at least one outward-facing digital screen to adapt at least one vehicle light based on the collected data, wherein the controlling the at least one outward-facing digital screen to adapt the at least one vehicle light comprises adapting a position of a rear light based on at least one of:
    a size of a trailing vehicle; or
    detecting a queue of trailing vehicles.

2. The method according to claim 1, wherein the controlling the at least one outward-facing digital screen to adapt the at least one vehicle light based on the collected data comprises adapting an intensity of the vehicle light.

3. The method according to claim 1, wherein the adapting the at least one vehicle light comprises adapting a size of the at least one vehicle light.

4. The method according to claim 1, further comprising controlling the at least one outward-facing digital screen to adapt the at least one vehicle light based on current weather.

5. The method according to claim 1, further comprising controlling the at least one outward-facing digital screen to adapt the at least one vehicle light based on a current traffic situation.

6. The method according to claim 1, further comprising:
    detecting a potentially dangerous situation; and
    controlling the at least one outward-facing digital screen to provide a visual alert.

7. The method according to claim 1, wherein the vehicle lighting device comprises two outward-facing digital screens, wherein one of the outward-facing digital screens is arranged at each end of a vehicle, and wherein controlling the at least one outward-facing digital screen comprises controlling the two outward-facing digital screens, such that a front end of the vehicle becomes a rear end, and vice versa.

8. The method according to claim 1, wherein the vehicle lighting device comprises two outward-facing digital screens in a form of two foldable panels,
    the method further comprising:
    controlling the digital screens, such that the digital screens are folded out to form an aerodynamic tapered shape.

9. A control device configured for controlling a vehicle lighting device, wherein the vehicle lighting device comprises the control device and at least one outward-facing digital screen arranged at one end of a vehicle, wherein the control device is arranged to control the at least one outward-facing digital screen to show various types of vehicle lights, the control device being configured to:
    collect data relating to vehicle surroundings; and
    control the at least one outward-facing digital screen to adapt the vehicle lights based on the collected data, wherein the adapting the vehicle lights comprises adapting a position of a rear light, on the at least one outward-facing digital screen, based on at least one of:
    a size of a trailing vehicle; or
    detecting a queue of trailing vehicles.

10. The control device according to claim 9, wherein the control device is configured to adapt intensities of the vehicle lights.

11. The control device according to claim 9, wherein the control device is configured to adapt the size of the vehicle lights.

12. The control device according to claim 9, wherein the control device is configured to adapt the vehicle lights based on the current weather.

13. The control device according to claim 9, wherein the control device is configured to adapt the vehicle lights based on a current traffic situation.

14. The control device according to claim 9, wherein the control device is configured to detect a potentially dangerous situation and to control the at least one outward-facing digital screen to provide a visual alert.

15. The control device according to claim 9, wherein the control device is configured to control the at least one outward-facing digital screen to show a registration number of the vehicle.

16. The control device according to claim 9, wherein the control device is configured to control the at least one outward-facing digital screen to show traffic information.

17. A computer program comprising instructions which, when the program is executed by a computer, cause the computer to carry out a method according to claim 1.

18. A computer-readable non-volatile medium comprising instructions, which when the instructions are executed by a computer, cause the computer to carry out a method according to claim 1.

19. A vehicle lighting device comprising:
at least one outward-facing digital screen adapted to be arranged at one end of a vehicle; and
a control device, for the at least one outward-facing digital screen, according to claim 9.

20. A vehicle, comprising a vehicle lighting device according to claim 19.

21. The vehicle according to claim 20, wherein the vehicle comprises ends of the vehicle and at least two digital screens, one at each end of the vehicle.

22. The vehicle according to claim 21, further comprising the vehicle having a front end of the vehicle and a rear end of the vehicle, wherein each end of the vehicle is changeable by means of controlling the digital screens.

23. The vehicle according to claim 20, wherein the vehicle is assembled from a set of modules and comprises:
at least one drive module; and
at least one functional module;
wherein the at least one drive module comprises a pair of wheels and is configured to be autonomously operated and to drive the assembled vehicle, and wherein the at least one digital screen is arranged on the at least one drive module or on the at least one functional module.

24. The method of claim 1, wherein the at least one vehicle light comprises one or more of:
headlights;
blinkers;
rear lights;
brake lights;
warning signs; or
informative text.

25. The control device of claim 9, wherein the vehicle lights comprise one or more of:
headlights;
blinkers;
rear lights;
brake lights;
warning signs; or
informative text.

* * * * *